United States Patent [19]
Beaux

[11] Patent Number: 4,932,277
[45] Date of Patent: Jun. 12, 1990

[54] ACTUATOR FOR RENDERING INOPERATIVE A LATCH FOR IN PARTICULAR A MOTOR VEHICLE DOOR

[75] Inventor: Alain Beaux, Saint-Die, France

[73] Assignee: Rockwell-CIM, France

[21] Appl. No.: 349,725

[22] Filed: May 10, 1989

[30] Foreign Application Priority Data

May 11, 1988 [FR] France ................................ 88 06379

[51] Int. Cl.[5] ........................ E05B 17/20; E05B 47/00; F16H 25/20

[52] U.S. Cl. ........................................ 74/89.15; 74/107; 74/569; 292/201

[58] Field of Search ........................ 74/89.15, 569, 107; 292/201

[56] References Cited

U.S. PATENT DOCUMENTS

| | | | |
|---|---|---|---|
| 4,135,377 | 1/1979 | Kleefeldt et al. | 292/201 X |
| 4,723,454 | 2/1988 | Periou | 292/201 X |
| 4,735,447 | 4/1988 | Kleefeldt | 292/201 X |

*Primary Examiner*—Allan D. Herrmann

[57] ABSTRACT

This actuator comprises in combination an electric motor (1) capable of driving in rotation a screw (2) which shifts a nut (6) which positively drives a carriage (7) in the direction for rendering the latch operative and, through a spring (8), in the direction for rendering the latch inoperative, the carriage (7) driving an output lever (9) connected to the interior lever for rendering the latch inoperative; a pivotal cam (10) having cam surfaces along which is slidable a control stud (14) connected to the nut (6). This cam controls a connecting kinemative system (11, 12) connected to the interior lever for rendering the latch inoperative, on one hand, and to the exterior lever controlling the opening of the latch on the other hand, through means outside the case of the actuator. This anti-theft system permits unlocking the latch normally by means of a key from the anti-theft position in the event of a breakdown in the electric supply.

8 Claims, 10 Drawing Sheets

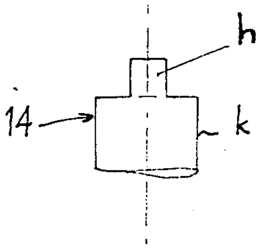
FIG. 8B
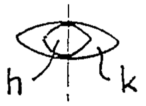
FIG. 8A
FIG. 9
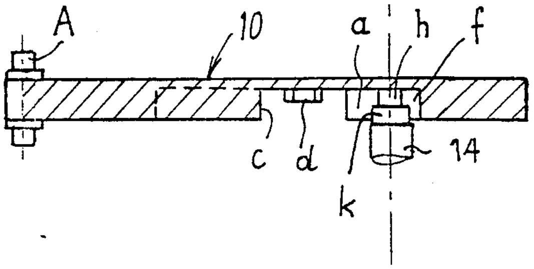
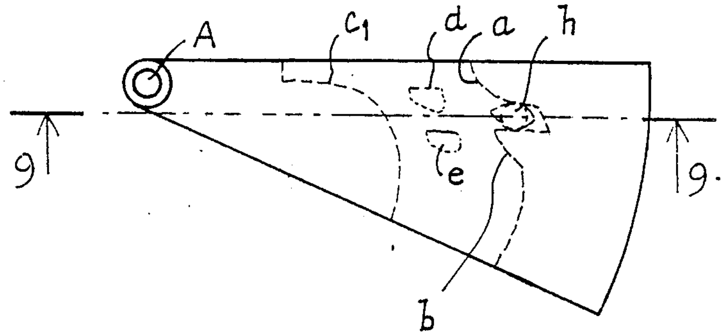
FIG. 10

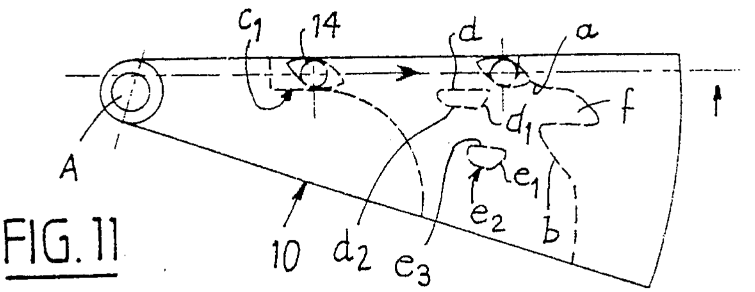
FIG. 11
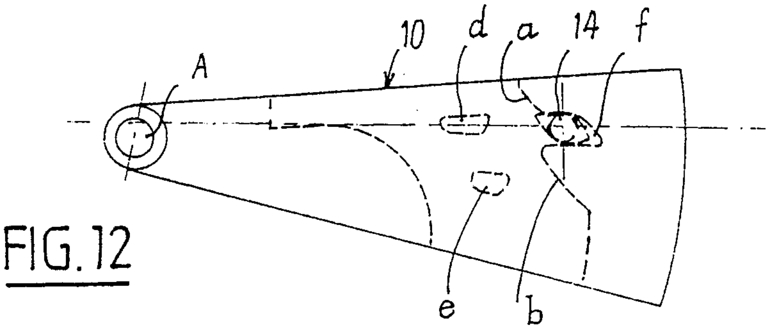
FIG. 12
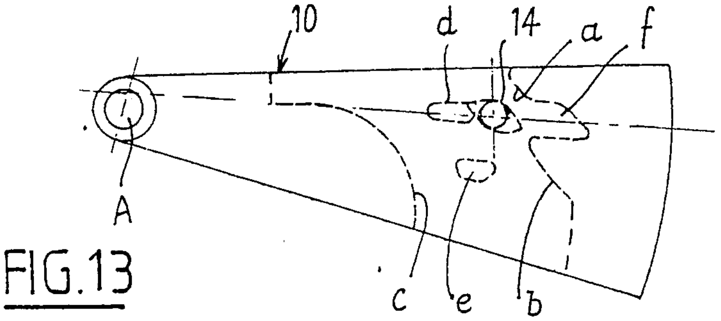
FIG. 13
FIG. 14
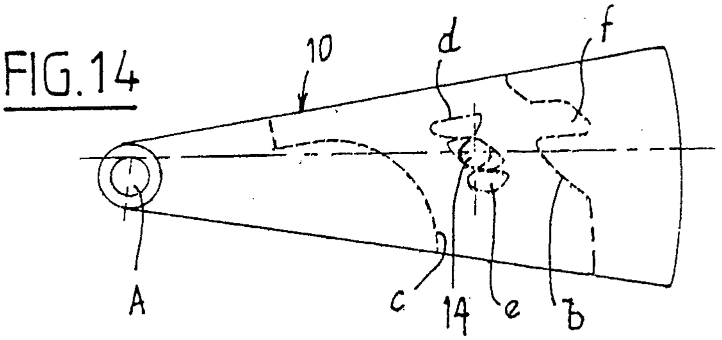

ACTUATOR FOR RENDERING INOPERATIVE A LATCH FOR IN PARTICULAR A MOTOR VEHICLE DOOR

BACKGROUND OF THE INVENTION

1. Field of the Invention

The present invention relates to an actuator for rendering inoperative a latch, in particular for a vehicle door.

2. Description of the Related Art

An actuator for rendering inoperative a latch of a vehicle door is known from French patent No. 85 11 189 which comprises an electric motot driving in rotation a reversible screw with which is screw-threadly engaged a carriage carrying a shoe, the assembly being moved in translation for actuating a lever rendering the latch inoperative. The shoe slides on a planar cam provided with cam surfaces moving in vertical translation. It is capable of locking the carriage in the position in which the latch is electrically rendered inoperative after having slid along the cam surfaces. In this way any manual rendering of the latch operative from its anti-theft position is prevented.

Consequently, in order to be nonetheless in a position to open the latch in the case of an electrical breakdown this actuator requires the addition of an emergency device employing a complex bolt in the latch.

An object of the invention is therefore to propose an actuator which is so arranged that, in the event of an electrical breakdown the unlocking of the latch can be achieved without the addition of a complex and expensive emergency bolt.

SUMMARY OF THE INVENTION

The actuator according to the invention comprises in combination:

(a) an electric motor capable of driving in rotation a reversible screw extending a nut which is prevented from rotating and is slidable in a carriage through which the screw extends, and control means between the carriage and a lever for rendering the latch inoperative.

(b) a cam mounted to be pivotal about a pin connected to a case containing the aforementioned component parts on which are provided cam surfaces along which is slidable a control element permitting the rotation of said cam, connected to the nut, driven in translation in a positive or negative direction by the operation of the motor, (c) a connecting kinematic system between the cam, on one hand, an interior lever for rendering the latch inoperative and an interior lever for controlling the opening of the latch, on the other hand, (d) elastic return means for returning the nut to its initial position after axial travel in the positive direction of translation of the nut on the screw, (e) the cam surfaces of the cam having such profiles as to permit, through said kinematic system, the passage from a position of said levers for rendering the latch operative, to a position for rendering the latch inoperative or inversely, then the passage from the position for rendering the latch inoperative to an anti-theft position in which the interior lever for rendering the latch inoperative is released through the medium of said kinematic system and rendered inoperative and the interior latch opening lever is locked, and the passage from the anti-theft position to the position in which the latch is rendered operative.

In this way, it is no longer necessary to add to the actuator a particular emergency device for rendering the latch operative from its anti-theft position. Indeed, in the event of an electrical breakdown when the actuator is in the anti-theft position, the latch may be normally unlocked with a key by the manual actuation of the lever for rendering the latch inoperative which drives the carriage through said means and therefore the nut and the cam to the position for rendering the latch operative.

According to a feature of the invention, the cam is provided with a first lug and a second lug which are profiled and spaced apart a distance allowing the insertion therebetween of a profiled control stud constituting said element connected to the nut, this position of the stud corresponding to the position for rendering the latch inoperative.

Further features of the invention will be apparent from the following description with reference to the accompanying drawings which illustrate a non-limitative embodiment thereof.

BRIEF DESCRIPTION OF THE DRAWING

FIG. 8A is a double top plan insert; view and FIG. 8A is an elevation view of the stud connected to the cam control nut.

FIG. 9 is a sectional view taken on line 9—9 of FIG. 10.

FIGS. 11 to 14 are top plan views of the cam and its control stud connected to the nut, showing the successive stages of a sequence of the passage from the position for rendering the latch operative to the position for rendering the latch inoperative.

DESCRIPTION OF THE PREFERRED EMBODIMENTS

Figure 1:
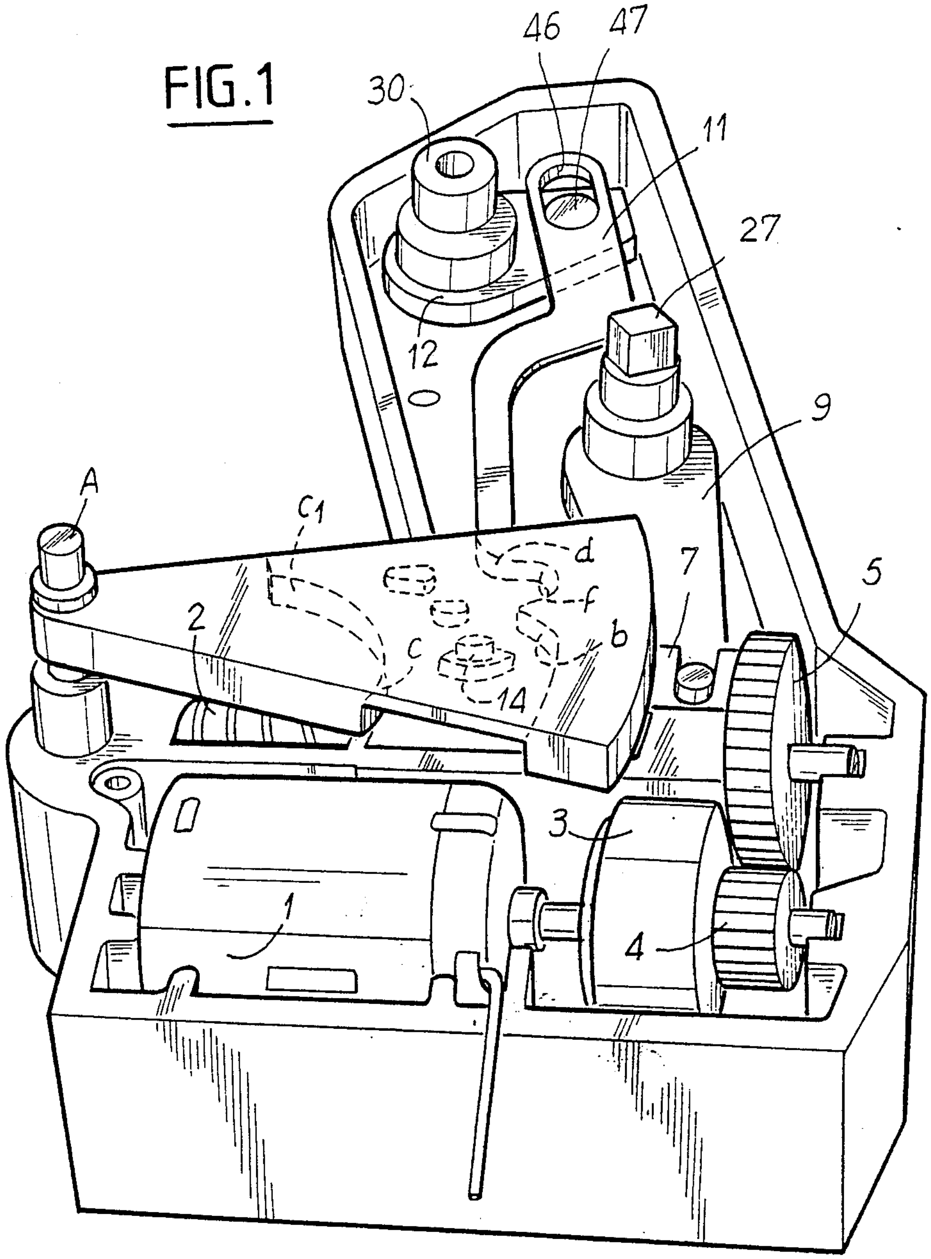
FIG. 1 is a perspective view of an embodiment of the actuator for rendering inoperative a latch of a door according to the invention, the cover having been removed.

The actuator shown in the drawings is adapted to render inoperative a latch of in particular a vehicle door and comprises in combination the following elements:

(a) an electric motor 1 capable of driving in rotation a reversible screw 2 through a clutch 3, and a train of gears 4 and 5. The screw 2 extends through a nut 6 which slides in a groove of a carriage 7 connected to an interior lever 17 for rendering the latch inoperative through an arm 9 pivoted to the carriage and carrying a pin 27;

(b) a cam 10 pivotally mounted on a pin A connected to a case 18 containing the aforementioned component parts and the component elements of the actuator proper. Provided on this cam 10 are curved cam surfaces a, b, c, along which is slidable a control element 14, the latter being constituted, in the presently-described embodiment, by a stud integral with the nut 6. It is in the course of the displacement in translation of the stud 14 on the cam surfaces of the cam 10 that the latter pivots about the pin A. The displacement in the positive direction (toward the right as viewed in FIGS. 4 to 6) or negative direction of the carriage 7 carrying the nut 6, depends on the direction of rotation of the motor 1;

(c) a connecting kinematic system 11, 12, 31, 13 between the cam 10, on one hand, an interior lever 17 for rendering the latch inoperative and an interior lever 20 for controlling the opening of the latch, on the other hand;

(d) elastic return means for returning the nut 6 to the initial position of the nut at the inner end of the groove of the carriage 7, constituted by a compression spring 8 which maintains the nut 6 in said groove; the motor 1, rotating in the trigonometric direction, drives the screw 2 which is connected to the gear wheel 5 in the clockwise direction, thereby shifting the carriage 7 and the nut 6 in the positive direction. When the carriage 7 reaches the end of its travel, the nut 6 compresses the coil spring 8 in the inner end of the groove of the carriage and slides in the groove up to slideway abutments; this position of the carriage 7 mechanically renders the mechanism of the latch inoperative;

(e) the cam surfaces a, b, c being so profiled as to permit the passage from a position of said levers 17 and 20 for rendering the latch operative to a position for rendering the latch inoperative or inversely, then the passage from the position in which the latch is rendered inoperative to an anti-theft position in which the interior lever 17 for rendering the latch inoperative is released through said kinematic system, thereby rendering it inoperative and the interior opening lever 20 is locked, and the passage from the anti-theft position to the position in which the latch is rendered operative.

In order to permit these functions, the cam 10 is provided with a first lug d and a second lug e defining suitably profiled cam surfaces, and spaced apart a distance which allows insertion therebetween of the control stud 14. The lever 17 rotatable about the pin 27 and the lever 21 driven by this pin form a unit capable of engaging like scissors a pin 28 of the link 13. The lever 21 has a bistable position owing to an associated member 22 and the lever 17 is retained by a torsion spring 23.

The connecting kinematic system between the cam 10 and the two levers 20, 17 comprises a lever 11 pivotally mounted on the cam 10, a first link 12 pivotally mounted in a slot 47 in a said lever so as to allow the latter to slide relative to the link 12, a second link 31 connected to rotate with the first link 12 and pivotally mounted on an arm 13 which carries pins 28, 26 for releasing the interior lever 17 for rendering the latch inoperative and rendering inoperative the interior lever 20 controlling the opening of the latch when the stud 14 and the cam 10 are in the anti-theft position. The links 12 and 31 are connected to rotate together by the shaft 30.

Figure 2:
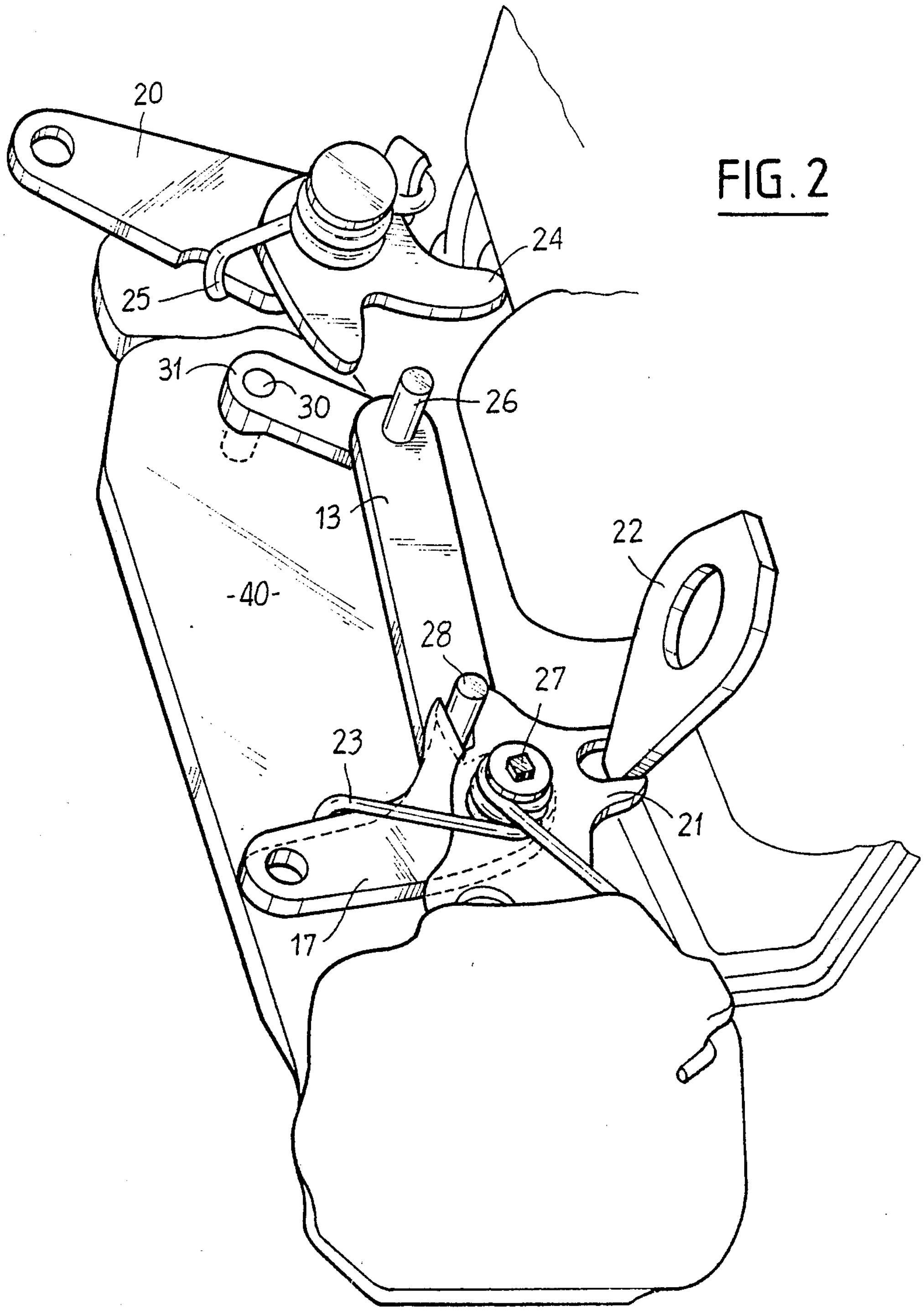
FIG. 2 is an outside perspective view of the actuator and the associated levers of the latch mechanism.

The mechanism shown in FIG. 2 mounted on a cover 40 is fitted on the top of the case 18 controlling the anti-theft shown in FIG. 1 by pins 27 and 30 which extend through the cover 40.

Arranged in the cam 10 is a first inclined cam surface a extending from the edge of the cam and extended by a notch f in which the stud 14 is capable of engaging. The cam further comprises a second curved cam surface b contiguous to the notch f and extending from the latter on the side opposed to the first cam surface a, the cam surface b being convex with a suitable radius of curvature.

The cam 10 comprises a third convex cam surface c which is positioned in confronting relation to the cam surface b and the notch f, but has a different radius of curvature. The two lugs d, e are located between, on one hand the cam surface c, and on the other hand the cam surfaces a, b and the notch f.

These lugs d and e have a height which is about one half of the height of the cam surfaces a, b, c (FIG. 9). They have contour lines so designed as to permit the suitable sliding of an end portion h of the stud 14 extending a larger portion k adapted to slice along the cam surfaces a, b or c (FIGS. 8A, 8B, 9). The stud 14 therefore has two steps or portions (h, k), each of which has a special geometry to be capable of correctly moving against the cam surfaces a-b-c and the lugs d-e in such manner as to pivot the cam 10 in one direction or the other. The two lugs d and e are therefore solely in contact with the upper portion h of the stud 14 while the cam surfaces a-b-c receive both the upper portion h and the lower portion k. The lugs d and e have two surfaces respectively d1, e1, which are inclined with respect to the cavity f and the cam surface b, extended by two other surfaces d2, e2, which extend downwardly as viewed in FIGS. 10 to 17. The lug e is provided with a surface e3 in front of the surface d2. The convex cam surface c is extended toward the pin A by a rectilinear cam surface c1.

The sequences of operation of the actuator will now be described with reference to FIGS. 10 to 17.

1. Passage from the rendering of the latch operative to rendering of the latch inoperative (FIGS. 11 to 14 and 3-4.

In the position for rendering the latch operative (FIG. 11), the stud 14 is in bearing relation to the cam surface c1. The arm 13 is in the position shown in FIG. 2 in which the interior lever 20 controlling the opening of the latch may be operated. The arm 13 is indeed engaged by its pin 28 between the levers 17 and 21 which permits the releasing of the interior lever 17 for rendering the latch inoperative, while the pin 26 is not engaged in the fork 24.

Figure 3:
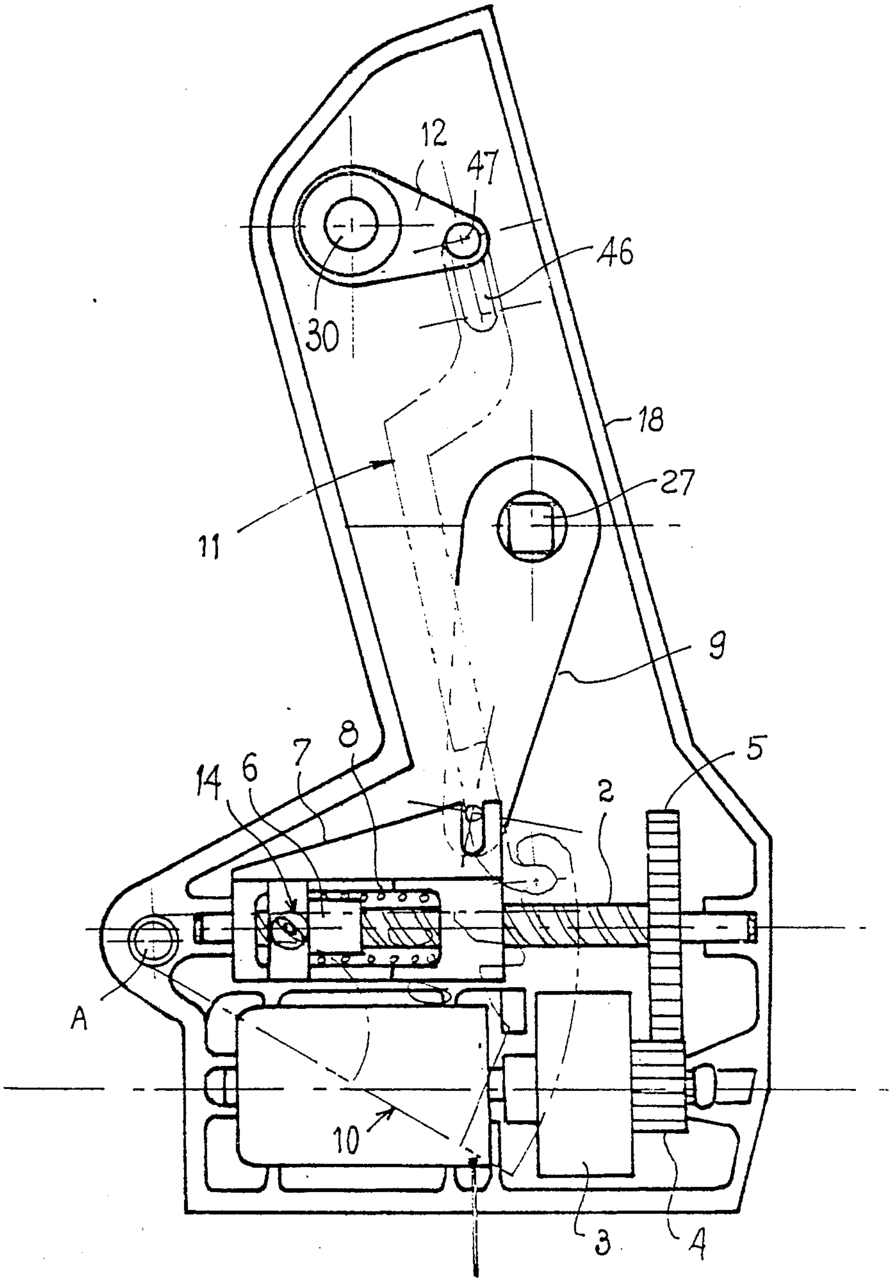
FIG. 3 is a top plan view of the actuator of FIG. 1, in the position for rendering the latch operative, the cam being shown in dot-dash lines in order to render the drawing more clear.
Figure 4:
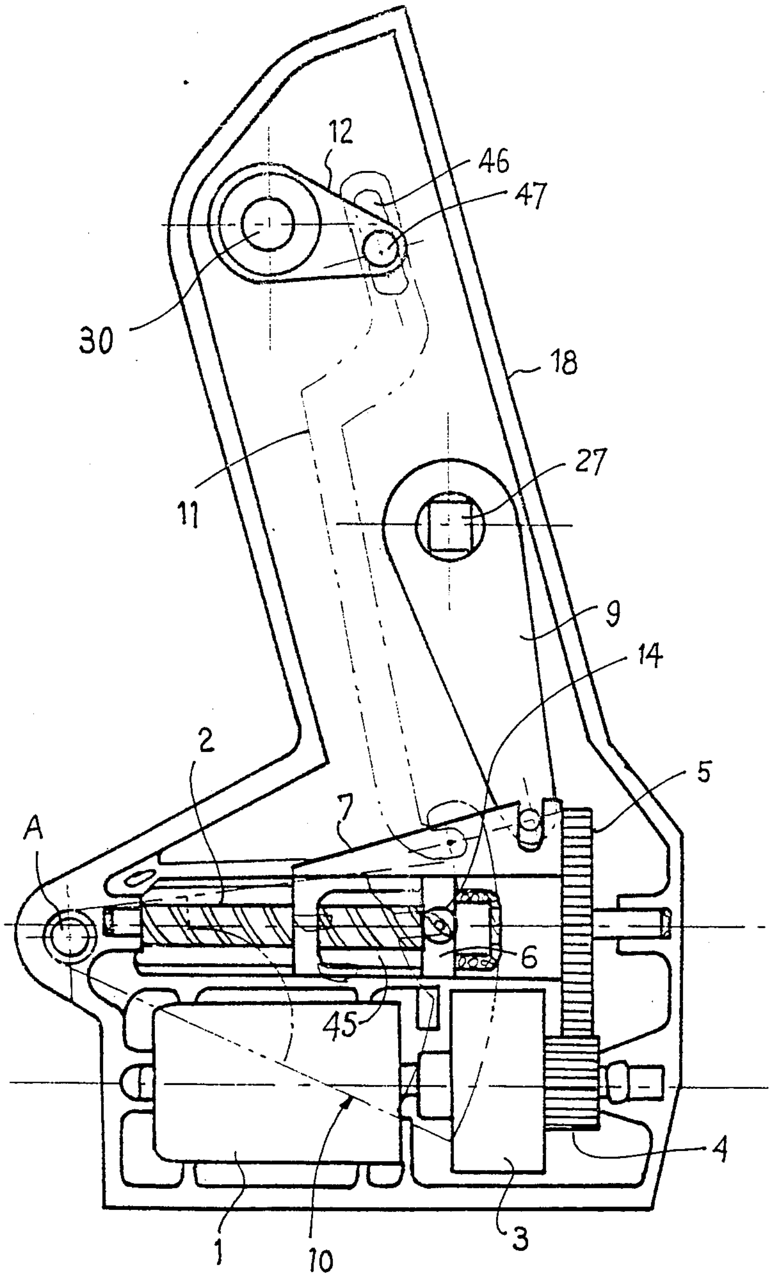
FIG. 4 is a view similar to FIG. 3 of the actuator in the position in which the spring is compressed by the nut during the passage from the position for rendering the latch operative to the position for rendering the latch inoperative.

The operator gives a pre-programmed impluse to the motor 1 so as to shift the stud 14 toward the right, as viewed in FIGS. 3 and 11. The upper portion h and lower portion k of the stud 14 slide along the first cam surface a and cause the cam 10 to pivot in the counter-clockwise direction about the pin A until the stud 14 is engaged at the inner end of the notch f (FIG. 12). The nut 6 drives in its movement in translation in the positive direction the carriage 7 which causes the arm 9 and the lever 17 to pivot and the spring 8 is then compressed to the maximum extent (FIG. 4). In the course of its pivoting, the cam 6 drives the lever 11 in translation and the slot 46 of the latter slides relative to its pivotal connection 47 on the link 12, but in a travel which is insufficient to modify the angular position of the link 12 (FIG. 4).

Then, as the motor 1 is no longer supplied with power, the spring 8 is allowed to extend and automatically returns the stud 14 to the inner end of the slot 45 of the carriage 7, in a position for rendering the latch inoperative (FIGS. 13, 14). In the course of this rearward movement, it is the upper portion h of the stud 14 which comes into contact with the surface d1 and comes to slide between the inner surfaces d2, e3 of the lugs d, e, which causes an additional pivoting of the cam 10 in the same direction as before. At the end of the travel, the end portion h of the stud is immobilized between the two lugs. The pivoting of the cam 10 from its position shown in FIG. 11 to that shown in FIG. 14 causes a displacement of the lever 11 which puts the stud 47 in contact with the inner end of the slot or oblong aperture 46. But this movement causes no displacement of the links 12, 31 and the lever 13. Therefore, the pin 28 remains engaged between the levers 17 and 21 and the interior lever 20 controlling the opening of the latch remains free.

In this position in which the latch is rendered inoperative, if it is then desired to reach the position for rendering the latch operative, an impluse is given to the motor 1 in the direction opposed to the first-mentioned direction and the contiguous portions h and k of the stud 14 slide along the cam surface c (FIG. 19) and reach the cam surface c1 in the position for rendering the latch operative (FIGS. 11 and 3).

2. Passage from the position in which the latch is rendered inoperative to the anti-theft position (FIGS. 14 to 17)

In starting at the position for rendering the latch inoperative (FIG. 14), a second impulse is given to the motor 1 in the same direction. Consequently, the stud 14 travels in the positive direction toward the right, as viewed in FIG. 15, and comes into contact with the beginning of the cam surface b, at the edge of the notch f, which causes the pivoting of the cam 10 in the same counter-clockwise direction as before. Then, as the motor 1 is no longer supplied with power, the spring 8 automatically returns the nut 6 with its stud 14 to the inner end of the slot 45 of the carriage 7. The end portion h of t h is stud 14 then slides along the surface e1 of the lug e and takes up the position shown in FIG. 17 and continues to pivot the cam 10. In this way the portion h of the stud 14 is finally in contact with the surface e2.

Figure 17:
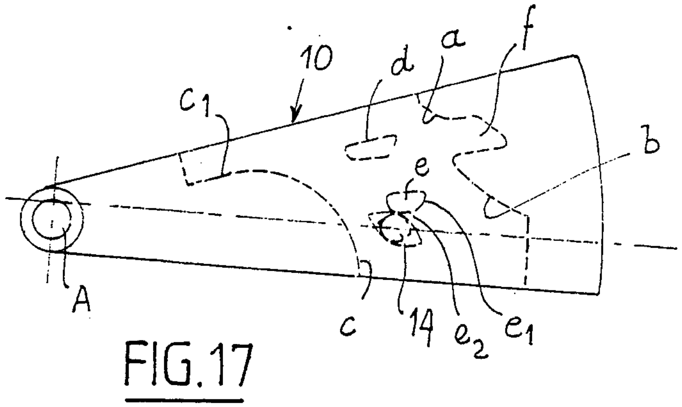

The two succesive angular travels of the cam 10 from the position shown in FIG. 14 to that shown in FIG. 17 control the anti-theft function of the actuator through the kinematic system 11, 12, 31, 13.

Figure 5:
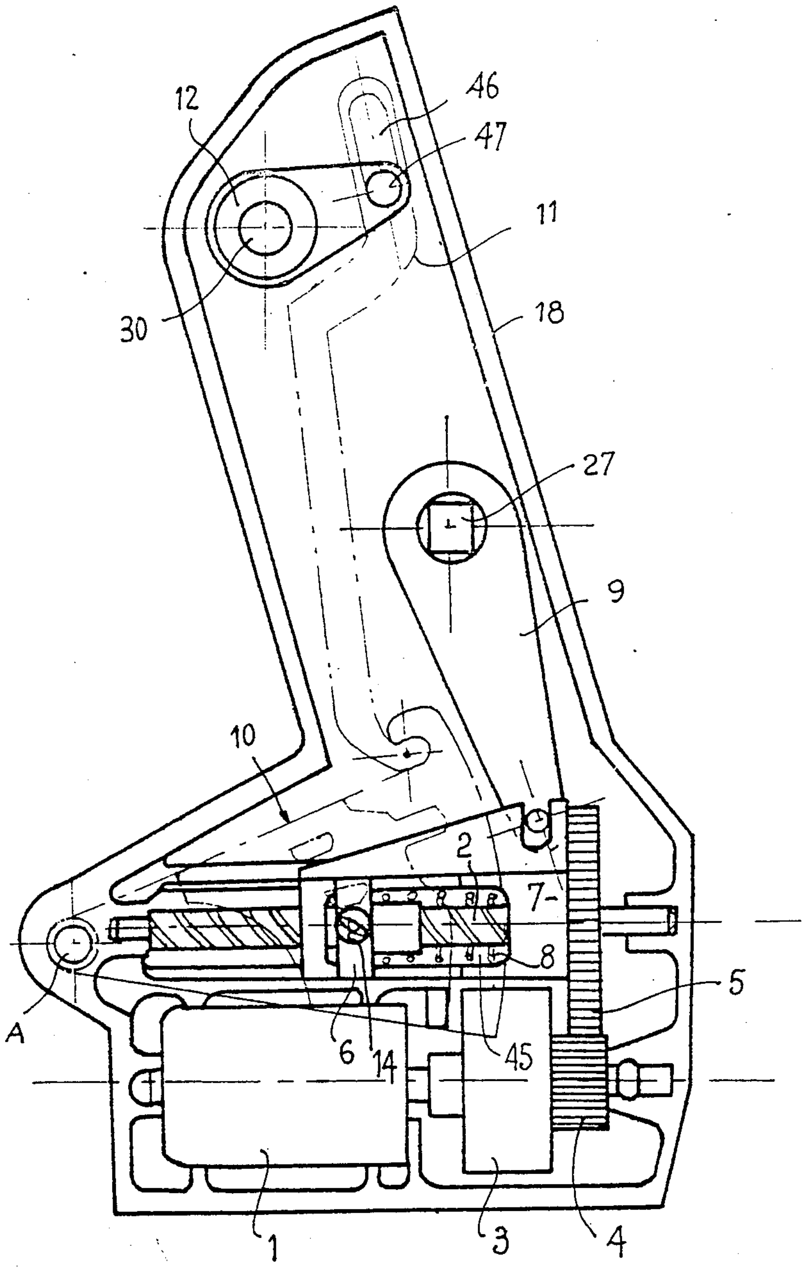
FIG. 5 is a view similar to FIGS. 3 and 4 of the actuator in the anti-theft position.
Figure 6:
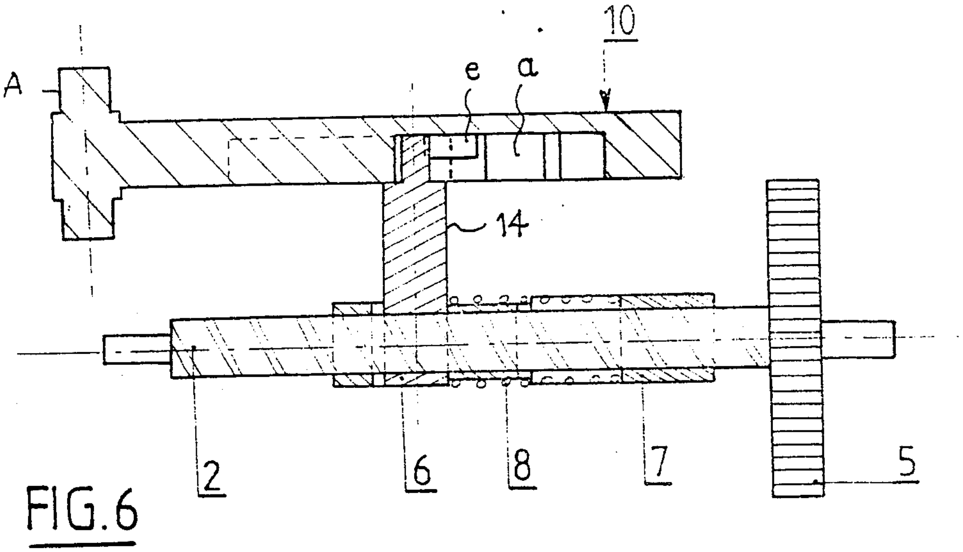
FIG. 6 is a sectional view taken on line 6—6 of FIG. 7 of the cam and its control mechanism.
Figure 7:
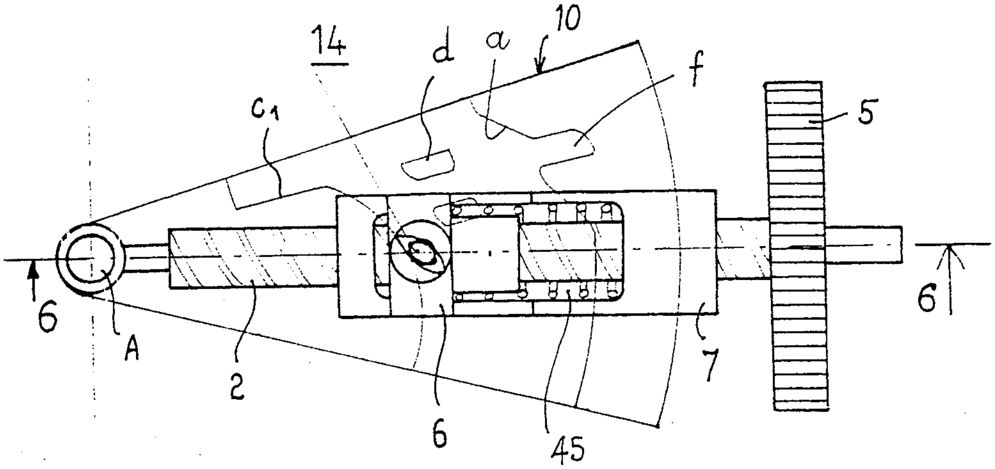
FIG. 7 is a top plan view of the cam and, owing to the transparency of the latter, of the control mechanism thereof.
Figure 15:
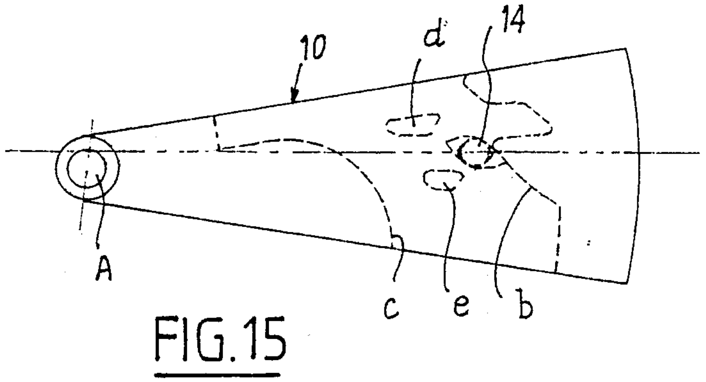
FIGS. 15 to 17 are views similar to FIGS. 11 to 14 illustrating a sequence of the passage from the position for rendering the latch inoperative to the anti-theft position.
Figure 16:
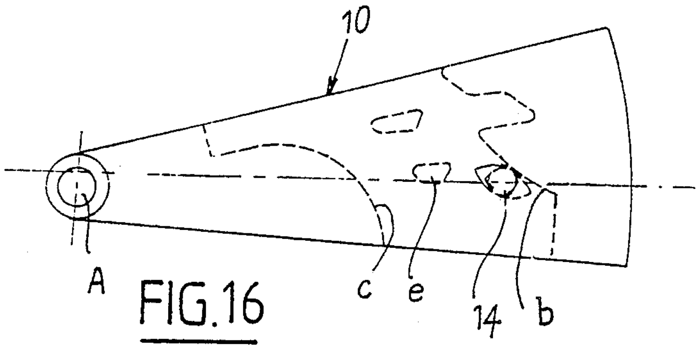

Indeed, the rotation of the cam 10 (FIGS. 15 to 17) drives the lever 11 so that the pin 47 abuts against the end of the slot 46 and the lever 11 pivots the links 12, 31, which are interconnected by the shaft 30, to their position shown in FIG. 5. This pivoting drives the lever 13 whose pin 28 is disengaged from the lever 17 and the fork 21 and whose pin 26 engages in the fork 24, which blocks the lever 20 and releases the interior lever 17 for rendering the latch inoperative, the interior control of the opening of the latch being thus rendered inoperative.

It should be noted that the carriage 7 remains fixed in position during the passage from the position for rendering the latch inoperative to the anti-theft position.

Figure 18:
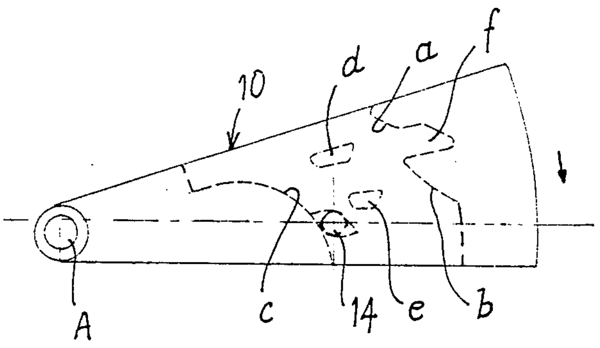
FIGS. 18 and 19 are views similar to the preceding Figures illustrating a sequence of the return of the cam from its anti-theft position of FIG. 17 to its position for rendering the latch operative shown in FIG. 11.
Figure 19:
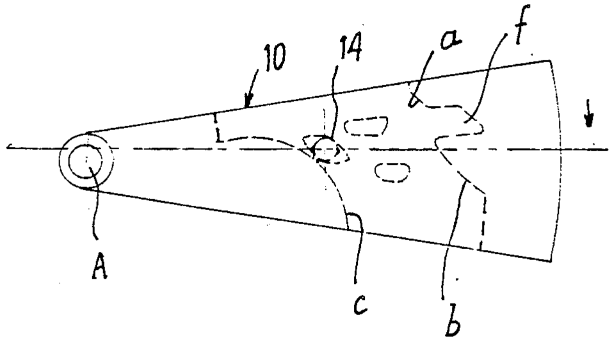

3. Passage from the anti-theft position to the position for rendering the latch operative (FIGS. 17 to 19)

In starting in the anti-theft position (FIG. 17), an impulse is given to the motor 1 to shift the stud 14 in the negative direction toward the cam surface c. The sliding of the end portion h of the stud 14 along the cam surface c pivots the cam 10 in the opposite direction (clockwise direction) relative to that which brought it to the anti-theft position (FIGS. 18 and 19). After sliding along the cam surface, the stud 14 stops on the cam surface c1 in the position for rendering the latch operative (FIG. 11).

Correlatively, the kinematic system 11, 12, 31, 13 was actuated to release the interior lever 20 for opening the latch from the pin 26 and engage the interior lever 17 for rendering the latch inoperative by the pin 28.

The actuator just described is provided with an anti-theft system which does not lock the device for rendering the latch inoperative but which controls through a suitable kinematic system the simultaneous release of the interior lever 17 for rendering the latch inoperative and the interior lever 20 controlling the opening of the latch. This anti-theft system is controlled by the cam 10 when it rotates about the pin A.

As already mentioned, it is possible to unlock the latch normally by means of a key from its anti-theft position shown in FIG. 17. Indeed, owing to the connecting arm 9 between the carriage 7 and the lever 17 for rendering the latch inoperative, the actuation of the latter by the key permits shifting the carriage 7, therefore the stud 14, the nut 6, the cam 10 and the kinematic system 11, 12, 31, 13 from the anti-theft position to the position for rendering the latch operative which permits the opening of the latch.

In the event of a breakdown in the electric supply for the motor, this is an important advantage relative to the actuator known from the aforementioned French patent and to those which require an additional complex safety bolt in this eventuality.

I claim:

1. Actuator for rendering inoperative a latch of in particaular a vehicle door, said actuator comprising:

(a) an electric motor, a carriage, a reversible screw extending through the carriage, a nut screw-threadedly engaged with the screw, the motor being drivingly connected to the screw, and the nut being prevented from rotating and slidable in the carriage, a lever for rendering the latch inoperative and control connecting means between the carriage and said lever;

(b) a case, a pin connected to the case, a cam pivotally mounted on said pin in which cam are provided cam surfaces, a control element for rotating said cam and slidable on said cam surfaces and mounted on the nut and drivable in translation selectively in a positive direction and a negative direction by the operation of the motor;

(c) a fist interior lever for rendering the latch inoperative and a second interior lever for controlling the opening of the latch, a connecting kinematic system between the cam and the first interior lever and between the cam and the second interior lever;

(d) elastic return means associated with the nut for returning the nut to an initial position thereof after an axial travel thereof in said positive direction of translation along the screw;

(e) the cam surfaces being so profiled as to permit a passage of said levers through said kinematic system selectively from a position for rendering the latch operative to a position for rendering the latch inoperative and inversely, then a passage from a position for rendering the latch inoperative to an anti-theft position in which said first interior lever is released through said kinematic system and rendered inoperative and said second interior lever is locked, and a passage from the anti-theft position to a position for rendering the latch operative.

2. Actuator according to claim 1, wherein the cam is provided with a first lug and a second lug which are profiled and spaced apart a distance allowing an insertion therebetween of a profiled control stud constituting said control element mounted on the nut, said position of the stud between the lugs corresponding to the position for rendering the latch inoperative, and the lugs being disposed between said cam surfaces of the cam.

3. Actuator according to claim 2, wherein there are arranged in the cam a first inclined cam surface, a notch extending the first inclined cam surface and in which notch is capable of engaging the control stud at the end of a first travel in said positive direction under the effect of the motor in starting at a position for rendering the latch operative, after which, the motor being stopped, said elastic return means for the nut and the stud automatically bring the stud to the position between the two lugs in the position for rendering the latch inoperative.

4. Actuator according to claim 3, wherein the cam comprises a second curved cam surface contiguous with said notch an located on a side of the notch opposed to said first cam surface, against which cam surface is slidable the control stud driven by the motor in a second travel from the position for rendering the latch inoperative and in the same positive direction as during the first travel thereof, the return means automatically bringing the stud against one of the lugs in the anti-theft position after stoppage of the motor.

5. Actuator according to claim 4, wherein the cam comprises a third curved cam surface arranged substantially in confronting relation to the second cam surface from which second cam surface it is spaced by a given gap, the lugs being placed between the first cam surface and second cam surface on one hand, and the third cam surface on the other, and the stud being slidable on the third cam surface in a third travel in said negative direction by actuation of the motor in a direction opposed to the proceding direction and causing the cam to pivot until the cam returns to a position for rendering the latch operative.

6. Actuator according to claim 1, wherein the connecting kinematic system between the cam and said two levers comprises a third lever having a slot and pivoted to the cam, a first link pivotally mounted in said slot in said third lever to permit the third lever to slide relative to the link, a second link connected to rotate with the first link, an arm, pins on the arm, the second link being pivotally mounted on the arm, and the pins being operative to release the first interior lever and to render the second interior lever inoperative when the stud and the cam are in the anti-theft position.

7. Actuator according to claim 1, wherein the return means for the nut comprise a spring which is compressed, during a travel for rendering the latch inoperative, between the nut and an inner end of the carriage containing said nut and through which carriage the screw extends, said carriage being operatively and mechanically connected to said first interior lever.

8. Actuator according to claim 7, comprising an arm connecting said carriage to said first interior lever and pivotally mounted on said carriage and pivotally mounted on a pin carried by the case.

* * * * *